United States Patent
Joyce

(10) Patent No.: US 7,748,791 B2
(45) Date of Patent: Jul. 6, 2010

(54) COMBINATION SECONDARY MASTER CYLINDER AND BRAKE PEDAL COMPLIANCE DEVICE FOR AUTOMOTIVE BRAKING SYSTEM

(75) Inventor: John Joyce, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 565 days.

(21) Appl. No.: 11/697,752

(22) Filed: Apr. 9, 2007

(65) Prior Publication Data

US 2008/0246333 A1    Oct. 9, 2008

(51) Int. Cl.
*B60T 13/16* (2006.01)

(52) U.S. Cl. .................. 303/20; 303/11; 303/113.1; 303/115.5

(58) Field of Classification Search ............ 303/10, 303/11, 20, 113.1, 115.1, 115.4, 115.5, 119.1, 303/151, 152; 188/151 R, 152, 355, 358, 188/359; 60/562, 567, 579, 580, 581
See application file for complete search history.

(56) References Cited

U.S. PATENT DOCUMENTS

| | | | |
|---|---|---|---|
| 4,005,759 A | 2/1977 | Farr | |
| 4,181,366 A | 1/1980 | Dobner | |
| 4,270,806 A | 6/1981 | Venkaperumal et al. | |
| 4,425,005 A * | 1/1984 | Warwick | 303/3 |
| 4,591,016 A | 5/1986 | Matthews | |
| 4,730,877 A * | 3/1988 | Seibert et al. | 303/115.4 |
| 5,882,093 A * | 3/1999 | Enomoto et al. | 303/152 |
| 5,927,825 A * | 7/1999 | Schenk et al. | 303/115.2 |
| 6,164,733 A * | 12/2000 | Uzzell | 303/122 |
| 6,183,050 B1 * | 2/2001 | Ganzel | 303/10 |
| 6,216,808 B1 | 4/2001 | Kuno et al. | |
| 6,454,365 B1 * | 9/2002 | Arwine et al. | 303/155 |
| 6,494,547 B2 * | 12/2002 | Higashimura et al. | 303/152 |
| 6,508,523 B2 | 1/2003 | Yoshino | |
| 2004/0061375 A1 * | 4/2004 | Drott et al. | 303/20 |
| 2005/0231033 A1 | 10/2005 | Ganzel | |

FOREIGN PATENT DOCUMENTS

FR    2855137 A1 * 11/2004
JP    10044952 A * 2/1998

* cited by examiner

*Primary Examiner*—Thomas J Williams
(74) *Attorney, Agent, or Firm*—Jerome R. Drouillard; David Kelley

(57) ABSTRACT

A combination secondary master cylinder and brake pedal compliance device for an automotive braking system includes a cylinder having a signal chamber, a working chamber, and a compliance chamber. Elastic devices mounted within the working chamber and compliance chamber allow the apparent compliance of the friction braking system attached to the combination device to remain at a relatively constant value notwithstanding the presence of varying amounts of powertrain braking.

16 Claims, 3 Drawing Sheets

COMBINATION SECONDARY MASTER CYLINDER AND BRAKE PEDAL COMPLIANCE DEVICE FOR AUTOMOTIVE BRAKING SYSTEM

BACKGROUND OF THE INVENTION

1. Field of the Invention

The present invention is related to the control of the apparent compliance of a friction braking system. This system permits brake pedal characteristics, such as pedal effort and travel, experienced by the operator of a vehicle when achieving a desired braking result to be maintained at a relatively constant level, notwithstanding operation with varying amounts of powertrain braking.

2. Disclosure Information

Hybrid vehicles advantageously use regenerative braking to achieve enhanced fuel economy. In general, regenerative braking employs the use of an electric or hydraulic traction motor which functions not only as a motor, but also as a braking device, to power roadwheels attached to one or more axles of a vehicle. When the driver of the vehicle calls for braking, either by lifting off the accelerator, or by depressing the brake pedal, the vehicle may be decelerated entirely with regenerative braking at least initially, or with a combination of friction braking and regenerative braking, or with friction braking alone. Unfortunately, some hybrid vehicle braking systems produce a different response characteristic for the brake pedal when the vehicle is being operated with regenerative braking or the type of powertrain braking such as compression braking, as opposed to friction braking. This differential pedal feel arises because during intervals in which regenerative braking, or other powertrain braking, is being employed, it is not necessary for the vehicle's operator to depress the brake pedal with as much force to achieve a given deceleration, as would otherwise be the case where the vehicle is being braked by friction brakes alone.

A system according to the present invention maintains a relatively constant pedal feel across the full range of braking operation, whether operation is at 100% friction braking, or predominantly powertrain braking, such as regenerative braking.

SUMMARY OF THE INVENTION

A combination secondary master cylinder and brake pedal compliance device for an automotive braking system includes a cylinder having a signal chamber defined by a first end of the cylinder and a first free piston. The signal chamber receives brake fluid from a primary master cylinder actuated by the vehicle's driver. A working chamber extends in the cylinder between the first free piston and a second free piston. The working chamber has a port for connecting the working chamber with at least one friction braking unit, such as a disc or drum brake unit. A compliance chamber extends within the cylinder between the second free piston and a second end of the cylinder. A first elastic device extending within the working chamber between the first free piston and the second free piston, urges the first free piston and the second free piston to move apart from one another. This first elastic device is important to the simulation of a normal friction braking compliance characteristic. A second elastic device extending within the compliance chamber between the second free piston and the second end of the cylinder urges the second free piston in the direction of the first end of the cylinder; that is, the end of the cylinder occupied by the signal chamber.

The present combination compliance device further includes a pump for supplying pressurized brake fluid to the working chamber and/or the compliance chamber.

According to one aspect of the present invention, the first and second elastic devices each are in the form of separate metallic springs, with the first spring having a spring constant which is greater than the spring constant of the second spring.

According to another aspect of the present invention a first control valve is interposed between an outlet of the pump and the working chamber, with a second control valve being interposed between the pump outlet and the compliance chamber. A low pressure valve is interposed between the outlet of the pump and the brake fluid reservoir, which may either be the master cylinder reservoir, or a hydraulic accumulator.

According to another aspect of the present invention, a friction braking system for use with the vehicle having selective powertrain braking includes a primary master cylinder, at least one friction braking unit connected to the primary master cylinder, an isolation valve connected between the primary master cylinder and the at least one friction braking unit, for selectively preventing the master cylinder from directly activating the at least one friction braking unit, and the aforementioned combination secondary master cylinder and brake pedal compliance device.

According to another aspect of the present invention, a friction braking system according to the present invention may further include an antilock control unit interposed between the primary master cylinder and the at least one friction braking unit, as well as between the combination secondary master cylinder and brake pedal compliance device and the said at least one braking unit.

According to another aspect of the present invention, a friction braking system further includes a first control valve interposed between an outlet of the pump and a working chamber, and a second control valve interposed between the pump outlet and a compliance chamber. The system also includes a controller for operating the first control valve, the second control valve, and the pump so as to reduce the volume of fluid within the compliance chamber, while increasing pressure within the working chamber, without increasing the pressure within the signal chamber.

According to another aspect of the present invention, a method for providing friction braking with a vehicle, having both a powertrain braking system and a friction braking system, includes providing a master cylinder actuated by a foot pedal, with at least one friction braking unit connected with the master cylinder, and connecting a combination secondary master cylinder and brake pedal compliance device between the master cylinder and the friction braking unit. The method further includes controlling the apparent compliance of the master cylinder and the friction braking unit by operating the combination secondary master cylinder and brake pedal compliance device according to the steps of determining an amount of braking being demanded by a vehicle operator, and determining an amount of braking being provided by the powertrain braking system. The method further includes controlling the compliance of the combination secondary master cylinder and brake pedal compliance device so that the force input into the brake pedal required to produce a given amount of braking is generally independent of the amount of braking being provided by the powertrain braking system. The compliance of the secondary master cylinder and brake pedal compliance device is controlled by adjusting a fluid force and a spring force applied to a first piston in opposition to the fluid force from the master cylinder upon the first piston, with the first piston being housed within the combination compliance device.

According to another aspect of the present inventive method, a spring force applied to the first piston in opposition to fluid force from the master cylinder is adjusted by repositioning a second piston housed within the combination compliance device, which cooperates with the first piston to define a chamber within the spring is housed and confined axially. The fluid force applied to the first piston in opposition to fluid force from the master cylinder is adjusted by changing the pressure of brake fluid contained within a working chamber defined within the combination compliance device by the first piston and by a second piston also housed within the combination compliance device. The pressure within the working chamber may be increased by pumping brake fluid in the working chamber, and decreased by venting brake fluid from the working chamber.

The present braking system and method may be employed advantageously to control the brake pedal feel of a hybrid vehicle braking system to maintain the brake pedal force and travel required to achieve any particular level of braking force relatively constant, notwithstanding the use of varying amounts of powertrain braking.

Other advantages, as well as features and objects of the present invention will become apparent to the reader of this specification.

DETAILED DESCRIPTION OF THE PREFERRED EMBODIMENTS

Figure 1:
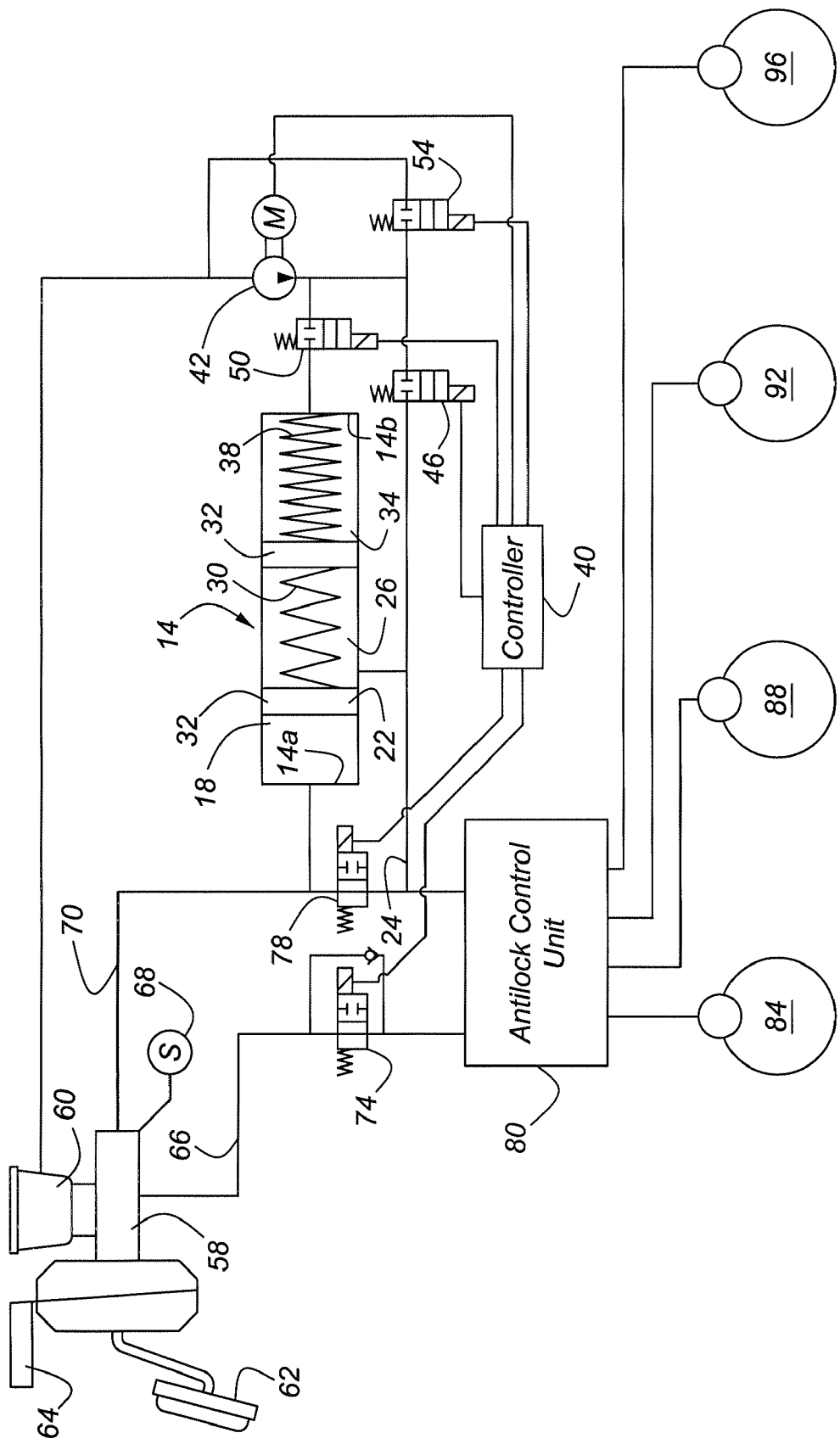
FIG. 1 is a schematic representation of a brake system having a combination secondary master cylinder and brake pedal compliance device according an aspect of the present invention.

As shown in FIG. 1, brake system 10 includes a combination secondary master cylinder and brake pedal compliance device 14. Combination device 14 includes a signal chamber 18, which extends between a first end, 14a, of combination device 14 and first free piston 22. As the nomenclature suggests, piston 22 and, for that matter, second free piston 32, are positioned by forces of fluids as well as forces imposed on the pistons by first elastic device 30, and second elastic device 38. Elastic devices 30 and 38 preferably comprise metallic springs, such as compression springs made of wound steel or other metallic or non-metallic or composite materials known to those skilled in the art and suggested by this disclosure. An antilock control unit, 80, is interposed between primary master cylinder 58 and friction braking units 84 and 88, as well as between combination secondary master cylinder and brake pedal compliance device 14 and friction braking units 92 and 96.

Signal chamber 18 is termed a "signal chamber" because it receives fluid from primary master cylinder 58, in response to the actuation of brake pedal 62. Primary master cylinder 58 is preferably a dual master cylinder. Primary master cylinder 58 has a reservoir, 60, for receiving and holding brake fluid. Two braking circuits, 66 and 70, are connected with master cylinder 58. As used herein, the term "brake control device" means a mechanism used by a motorist to actuate the braking system's master cylinder. A brake control device typically will include a brake pedal, but other types of brake control devices are known to those skilled in the art and suggested by this disclosure.

Brake circuit 70 conducts brake fluid to signal chamber 18, causing first free piston 22 to move away from end 14a of combination device 14, thereby compressing spring 30. During operation of the present system at intervals when braking force is developed solely from friction braking, isolation valves 74 and 78, which are controlled by controller 40, are open, and first elastic device 30, which in this case is depicted as a metallic spring, prevents first free piston 22 from moving in a direction away from bulkhead 14a. Thus, master cylinder 58 is free to provide pressurized brake fluid to friction brakes 84, 88, 92, 96 and to stop a vehicle equipped with the system in a normal manner. The base of spring 30 is anchored by second free piston 32, and as brake pedal 62 is depressed, the pressure within signal chamber 18 is equal to the pressure within primary master cylinder 58.

Operation of the present braking system is modified in the event that regenerative or other types of powertrain braking are employed. In this case, isolation valves 74, 78 will be closed, and high pressure fluid from master cylinder 58 will cause first free piston 22 to move to the right within combination device 14. When operating with purely regenerative braking, second free piston 32 will be maintained in a fixed position, as shown in FIG. 1, so as to allow spring 30 to simulate the compliance of a master cylinder and friction braking unit normally employed with the vehicle. In other words, the feel of the brake pedal will seem conventional to the vehicle's operator. If, however, regenerative braking must be reduced in the event that, for example, the vehicle's traction battery is fully charged such that only a limited amount of regenerative braking is available, this may lead to a condition in which the regenerative braking must be supplemented by friction braking, necessitating the admission of high pressure brake fluid to friction braking units 92 and 96. However, because spring 30 is already in a position to emulate the brake pedal feel for a deceleration rate achieved by the combined regenerative and friction braking systems, second free piston 32 must be allowed to move toward the direction of bulkhead 14b. This will reduce the force generated by spring 30.

Second free piston 32 is moved in the direction of bulkhead 14b by venting brake fluid from compliance chamber 34 through second control valve 50. Then, pump motor 42 furnishes high pressure fluid through first control valve 46 into working chamber 26. The pressure within working chamber 26, which is applied to friction braking units 92 and 96, is set so that the combined force of spring 30 and the fluid pressure acting upon first free piston 22 is approximately equivalent to the force exerted solely by spring 30 upon first free piston 22 when second free piston 32 was in its prior position and the fluid pressure within working chamber 26 was approximately atmospheric. Because the force exerted upon first free piston 22 is roughly equivalent to the force exerted alone by spring 30, the feel of the pedal, or, in other words, the force required to achieve a given level of braking, will remain relatively constant, notwithstanding a reduced level of regenerative braking and increased friction braking.

Figure 2:
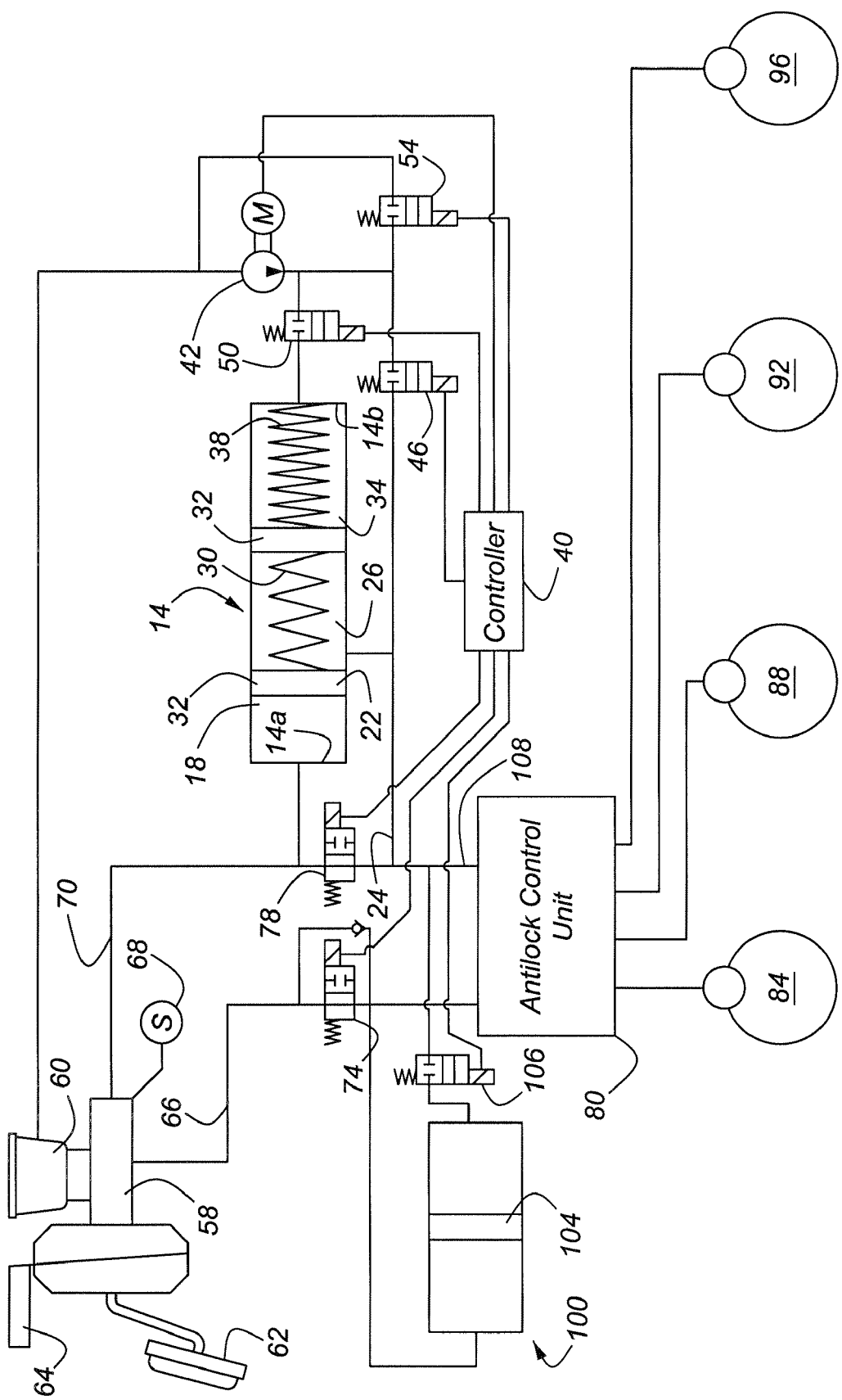
FIG. 2 depicts an alternative embodiment of a system according to an aspect of the present invention.

FIG. 2 shows an embodiment in which isolation device 100, having an isolation piston 104 and isolation device valve 106, are positioned between primary master cylinder 58 and a brake line, 108, leading from combination device 14 and antilock control unit 80. Isolation device 100 allows improved control authority over the pressure applied to friction brakes 84 and 88. Isolation device 100 may be used most advantageously on braking systems in which antilock control unit 80 has a suboptimal capability to modulate pressure with sufficient refinement for efficient regenerative braking.

Figure 3:
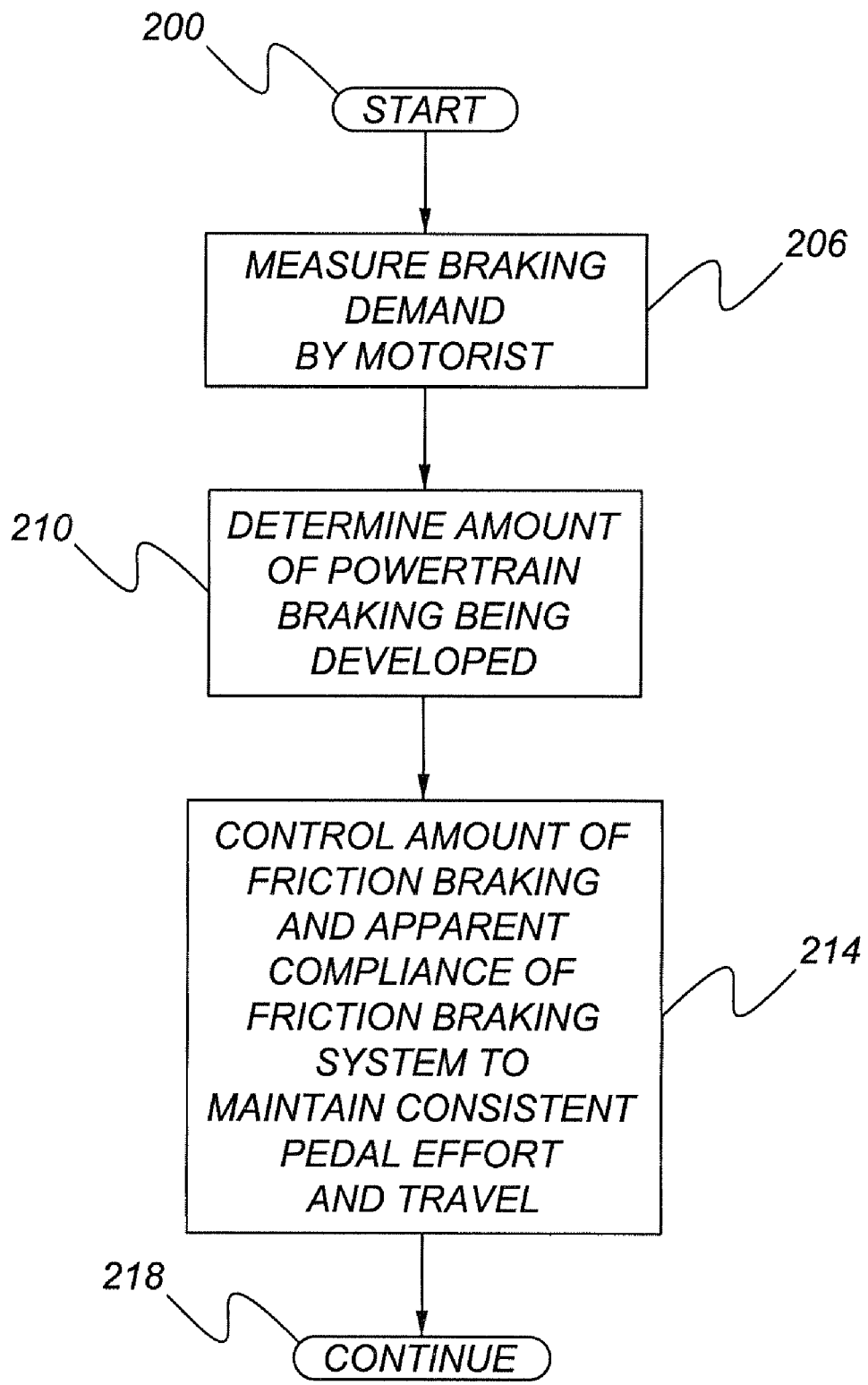
FIG. 3 is a flow chart illustrating a method according to an aspect of the present invention.

FIG. 3 illustrates a salient part of a method according to the present invention in which the present compliance device is employed for the purpose of maintaining the apparent compliance of a friction braking system at a constant level so as to avoid the problems associated with the need for the vehicle operator—i.e., the vehicle's driver, to depress the brake pedal with varying amounts of force—and with varying amounts of pedal travel—to achieve the same amount of braking, depending on whether the brakes are being operated at least in part regeneratively. The routine in FIG. 3 starts at block 200 and then moves to block 206, wherein the braking demanded by the motorist is measured. This may be achieved by measuring brake booster stroke with sensor 64, and by measuring primary brake system pressure with pressure sensor 68. Alternatively, brake pedal travel and brake pedal effort may be employed as surrogates for booster stroke and brake system pressure. Then, the routine moves to block 210, wherein the amount of powertrain braking being developed is determined. Then, at block 214, controller controls the amount of friction braking and the apparent compliance of the friction braking system to maintain a consistent pedal effort and travel. The term "apparent compliance" is employed here because the actual compliance of the friction braking system will remain relatively invariant. However, as noted above, the combination of the friction braking system and powertrain braking would, in the absence of the present inventive system and method, require considerable variations in the amount of pedal effort needed to achieve a given amount of braking force. If the apparent compliance is controlled as described above, the pedal effort and travel will be maintained at a consistent value for each amount of braking force, or in other words, for each amount of braking requested by the motorist. Thereafter, the routine continues at block 218.

Many modifications are possible with the present system and these include, without limitation, use of a hydraulic accumulator instead of a reservoir associated with primary master cylinder 58. Further, an orifice may be imposed between hydraulic pump 42 and the outlet of compliance chamber 34, obviating the necessity for second control valve 50. As yet another modification within the scope of the present invention, an orifice may be furnished upstream of signal chamber 18, to improve the dynamic force feedback from brake pedal 62. Further, the system may be constructed without antilock control unit 80. This will limit the control of the friction brakes connected to first isolation valve 74, but nevertheless allow pedal feel associated with brake pedal 62 to be maintained by modulation of the volume of compliance chamber 34. These and other modifications are within the scope of the following claims.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A combination secondary master cylinder and brake pedal compliance device for an automotive braking system, comprising:
    a cylinder comprising: a signal chamber, defined by a first end of said cylinder and a first free piston, for receiving brake fluid from a primary master cylinder;
    a working chamber extending between said first free piston and a second free piston, with said working chamber having a port for connecting the working chamber with at least one friction braking unit;
    a compliance chamber extending between said second free piston and a second end of said cylinder;
    a first elastic device, extending within said working chamber between said first free piston and said second free piston, for urging said first free piston and said second free piston to move apart from one another;
    a second elastic device, extending within said compliance chamber between said second free piston and the second end of said cylinder, for urging said second free piston in the direction of the first end of said cylinder; and
    a pump for selectively supplying pressurized brake fluid to said working chamber and to said compliance chamber.

2. A combination secondary master cylinder and brake pedal compliance device according to claim 1, wherein said first elastic device and said second elastic device each comprise a metallic spring.

3. A combination secondary master cylinder and brake pedal compliance device according to claim 1, wherein said first elastic device has a spring constant which is greater than the spring constant of said second elastic device.

4. A combination secondary master cylinder and brake pedal compliance device according to claim 1, further comprising a first control valve interposed between an outlet of said pump and said working chamber, and a second control valve interposed between said pump outlet and said compliance chamber.

5. A combination secondary master cylinder and brake pedal compliance device according to claim 1, further comprising a low pressure valve interposed between the outlet of said pump and a brake fluid reservoir.

6. A friction braking system for use with a vehicle having selective powertrain braking, comprising:
    a primary master cylinder;
    at least one friction braking unit connected to said primary master cylinder;
    an isolation valve, connected between said primary master cylinder and said at least one friction braking unit, for selectively preventing said master cylinder from directly activating said at least one friction braking unit;
    a combination secondary master cylinder and brake pedal compliance device, comprising: a cylinder comprising:
        a signal chamber, defined by a first end of said cylinder and a first free piston, for receiving brake fluid from said primary master cylinder;
    a working chamber extending between said first free piston and a second free piston, with said working chamber being connected to said at least one friction braking unit;
    a compliance chamber extending between said second free piston and a second end of said cylinder, with said compliance chamber having a port for allowing brake fluid to be added or removed from said compliance chamber;
    a first elastic device, extending within said working chamber between said first free piston and said second free piston, for urging said first free piston and said second free piston to move apart from one another;
    a second elastic device, extending within said compliance chamber between said second free piston and the second end of said cylinder, for urging said second free piston in the direction of the first end of said cylinder; and
    a pump for selectively supplying pressurized brake fluid to said working chamber and to said compliance chamber.

7. A friction braking system according to claim 6, further comprising an antilock control unit interposed between said primary master cylinder and said at least one friction braking unit, as well as between said combination secondary master cylinder and brake pedal compliance device and said at least one friction braking unit.

8. A friction braking system according to claim 6, further comprising:

a first control valve interposed between an outlet of said pump and said working chamber;

a second control valve interposed between said pump outlet and said compliance chamber; and a controller for operating said first control valve, said second control valve, and said pump so as to reduce the volume of fluid within said compliance chamber, while increasing the pressure within said working chamber, without increasing the pressure within said signal chamber.

9. A friction braking system according to claim 6, wherein said master cylinder comprises a dual master cylinder connected with a plurality of braking circuits, with each braking circuit having an isolation valve positioned between the master cylinder and a braking unit.

10. A method for providing friction braking with a vehicle having both a powertrain braking system and a friction braking system, comprising:

providing a master cylinder actuated by a brake control device, with at least one friction braking unit connected with said master cylinder;

connecting a combination secondary master cylinder and brake pedal compliance device between the master cylinder said at least one friction braking unit; and controlling the apparent compliance of said master cylinder and said at least one friction braking unit by operating said combination secondary master cylinder and brake pedal compliance device according to the steps of:

measuring an amount of braking being demanded by a vehicle operator;

determining an amount of braking being provided by the powertrain braking system; and controlling the compliance of said combination secondary master cylinder and brake pedal compliance device by adjusting a fluid force and a spring force applied to a first piston in opposition to fluid force exerted by fluid from said master cylinder upon said first piston, wherein said first piston is housed within said combination compliance device so that the force input to said brake control device required to produce the amount of braking being demanded by the vehicle operator is generally independent of the amount of braking being provided by the powertrain braking system, wherein said spring force applied to said first piston in opposition to fluid force from said master cylinder, is adjusted by repositioning a second piston housed within said combination compliance device and cooperating with said first piston to define a chamber within which a spring is housed.

11. A method according to claim 10, wherein said fluid force, applied to said first piston in opposition to fluid force from said master cylinder, is adjusted by changing the pressure of brake fluid contained within a working chamber defined within said combination compliance device by said first piston and by a second piston also housed within said combination compliance device.

12. A method according to claim 11, wherein the pressure within said working chamber is decreased by venting brake fluid from said working chamber and increased by pumping brake fluid into said working chamber.

13. A method according to claim 10, wherein said powertrain braking system comprises a regenerative braking system.

14. A method according to claim 10, wherein said brake control device comprises a brake pedal.

15. A method according to claim 10, wherein the amount of braking demanded by a vehicle operator is determined by measuring brake pedal travel.

16. A method according to claim 10, wherein the amount of braking demanded by a vehicle operator is determined by measuring brake pedal effort.

* * * * *